United States Patent [19]
Peer

[11] 4,084,115
[45] Apr. 11, 1978

[54] CIRCUIT FOR CORRECTING SETUP ERROR IN A COLOR TELEVISION RECEIVER

[75] Inventor: John Charles Peer, Indianapolis, Ind.
[73] Assignee: RCA Corporation, New York, N.Y.
[21] Appl. No.: 768,502
[22] Filed: Feb. 14, 1977
[51] Int. Cl.² ............................................ H01J 29/56
[52] U.S. Cl. ................................................. 315/371
[58] Field of Search ................ 315/370, 371, 380, 379

[56] References Cited
U.S. PATENT DOCUMENTS

| 4,020,390 | 4/1977 | Keinath et al. | 315/371 |
| 4,024,432 | 5/1977 | Boekhorst | 315/371 |

Primary Examiner—Maynard R. Wilbur
Assistant Examiner—T. M. Blum
Attorney, Agent, or Firm—Eugene M. Whitacre; Paul J. Rasmussen; Joseph Laks

[57] ABSTRACT

A horizontal deflection circuit of a color television receiver includes a horizontal output transformer with a secondary winding across which a voltage is developed and includes a horizontal deflection winding coupled to a pincushion correction winding of a pincushion reactor. In response to the current flowing in the vertical deflection winding, the inductance of the pincushion correction winding varies in a manner providing for East-West pincushion distortion correction. For setup, in the service mode of operation, the vertical deflection circuit is disabled. A circuit, coupled to the pincushion reactor, adjusts the inductance of pincushion correction winding to compensate for a change in the inductance caused by disabling of the vertical deflection circuit for maintaining the voltage across the horizontal output transformer secondary winding substantially unchanged during setup.

18 Claims, 2 Drawing Figures

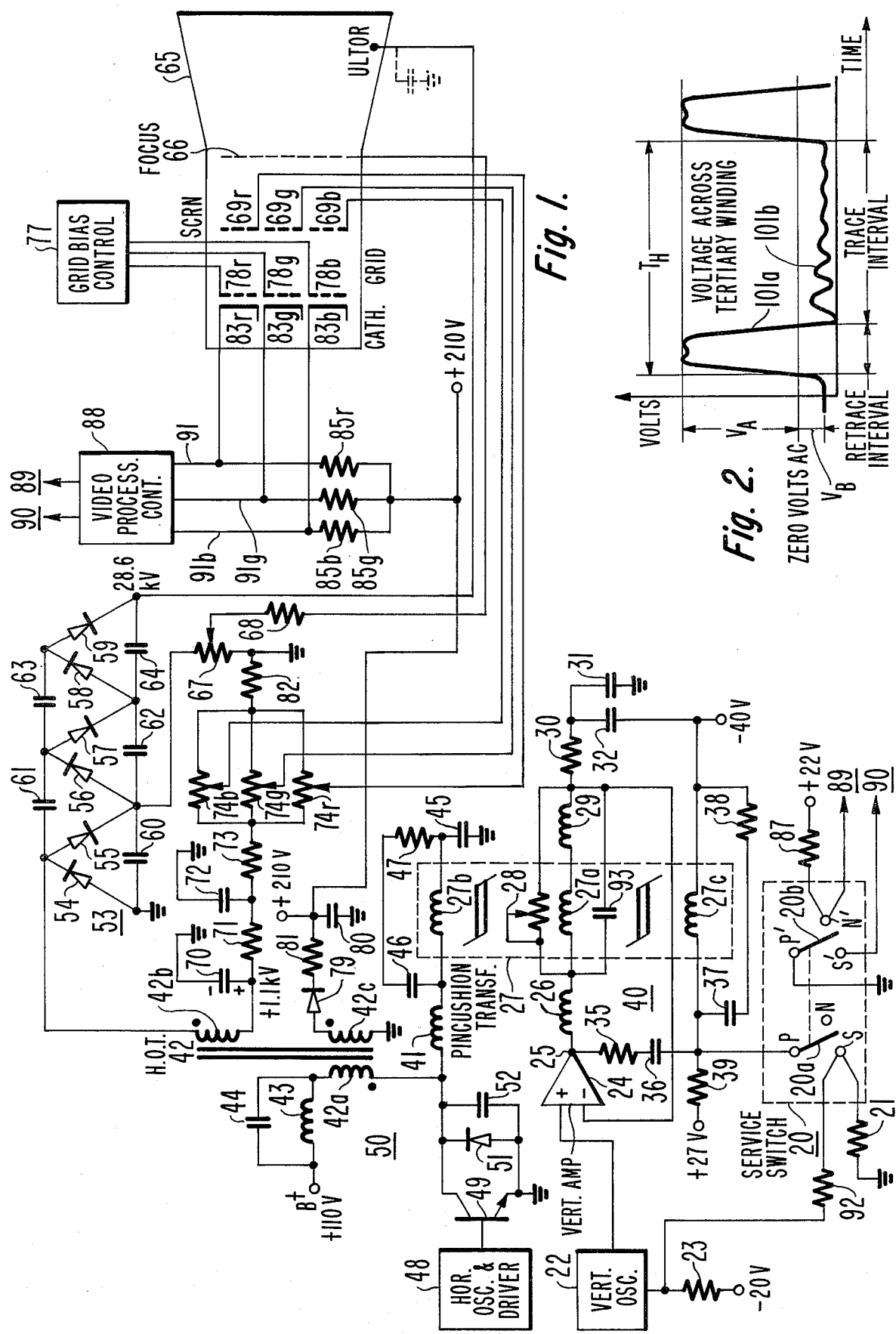

CIRCUIT FOR CORRECTING SETUP ERROR IN A COLOR TELEVISION RECEIVER

BACKGROUND OF THE INVENTION

This invention relates to color television receiver setup circuits.

In order to provide optimum operation of a color kinescope in a television receiver, certain controls associated therewith are adjusted in accordance with a procedure commonly referred to as a kinescope setup procedure. Basically, the setup procedure corrects for certain variations in television receiver operation caused by the multigun, multiphosphor nature of the kinescope. Such variations partly depend upon the cutoff characteristics of the electron guns and the efficiency of the respective phosphors. A function of the setup procedure is to obtain a maximally bright display and at the same time maintain the correct white color temperature at all brightness levels.

Many television receivers include service or setup switches which enable the operator to perform the setup procedure without requiring complicated test equipment. Such switching arrangements provide the capability for selectively switching the receiver from its normal operating mode to a service mode in which illustratively:

1. the normal video channel drive to the kinescope cathodes is disabled;
2. a predetermined reference black level voltage is applied to each of the kinescope cathodes; and
3. the receiver's vertical deflection circuitry is disabled to permit critical adjustment of the cutoff potential of each gun by observing the horizontal scan lines at the center of the viewing screen.

In many television receiver circuits, the bias voltages to the cathode and control electrodes of each electron gun are derived from the voltages appearing across secondary windings of the horizontal output transformer. If these transformer voltages change when switching from normal mode to service mode of operation, the cutoff and white color temperature characteristics established in the service mode will objectionally differ from the normal mode of operation. It is, therefore, desirable to maintain the aforementioned transformer voltages substantially unchanged in both modes of television receiver operation.

SUMMARY OF THE INVENTION

A color television receiver includes vertical and horizontal deflection circuits, a horizontal output transformer with a secondary winding across which a voltage is developed, and a horizontal deflection winding coupled to a pincushion correction winding of a pincushion correction arrangement. The inductance of the pincushion correction winding varies in response to the generated vertical deflection current for providing a pincushion correction signal to the horizontal deflection winding. During setup, a service switch disables operation of the vertical deflection circuit. A circuit coupled to the pincushion correction arrangement adjusts the inductance of the pincushion correction winding to compensate for a change in inductance of the pincushion correction winding during setup for maintaining the voltage across the horizontal output transformer secondary winding substantially unchanged.

BRIEF DESCRIPTION OF THE DRAWING

FIG. 1 illustrates color television receiver circuitry embodying the invention; and FIG. 2 illustrates a waveform associated with the circuitry of FIG. 1.

DESCRIPTION OF THE INVENTION

A service switch 20 of FIG. 1 is used for setup operation of the television receiver. Switch 20 comprises two ganged switching elements 20a and 20b. In the normal mode of operation, switching element 20a connects a terminal P to a terminal N, which itself is unconnected, and switching element 20b connects a terminal P' to a terminal N'. In the service mode of operation, terminal P is connected to a terminal S, and terminal P' is connected to a terminal S'.

In the normal mode of operation, a vertical oscillator 22 of a vertical deflection circuit 40 is coupled to a −20V source of operating potential through a resistor 23. Oscillator 22 provides a conventional sawtooth waveform, repeating at a vertical frequency $1/T_v$, to a noninverting terminal of a vertical amplifier 24. A vertical sawtooth voltage at an output terminal 25 is coupled to a vertical deflection winding 26 for generating vertical deflection current in winding 26.

Coupled in series to vertical deflection winding 26 is a first load or secondary winding 27a of a pincushion correction saturable reactor 27. Reactor 27 also includes a second load or secondary winding 27b coupled in series with a horizontal deflection winding 41 and further includes a pincushion control winding 27c. Pincushion reactor 27 may be of a type disclosed in U.S. Pat. No. 3,940,662.

Coupled to vertical pin winding 27a are an inductor 29, a feedback resistor 30 and parallely arranged coupling capacitors 31 and 32. Capacitor 31 is coupled to ground, and capacitor 32 is coupled to a −40V supply. A feedback voltage developed at the junction of inductor 29 and resistor 30 is coupled to an inverting terminal of vertical amplifier 24. The elements of vertical deflection circuit 40 operate in a known manner to produce a sawtooth deflection current through vertical deflection winding 26.

The vertical sawtooth voltage at terminal 25 is coupled to the pin control winding 27c through a resistor 35 and a capacitor 36. The sawtooth voltage is filtered by a capacitor 37 and a resistor 38 and integrated by pin control winding 27c into a parabolic current at the vertical frequency. Since one end of the winding 37c is coupled to a +27V supply through a resistor 39 and the other end of the winding is coupled to the −40V supply, a DC bias current flows through pin control winding 27c. The bias current establishes a bias flux in the transformer core. The vertical rate parabolic current couples an additional parabolic magnetic flux to horizontal pin winding 27b. This parabolic flux varies the inductance of horizontal pin winding 27b in a manner providing for East-West pincushion correction.

A horizontal deflection circuit 50 includes the horizontal deflection winding 41 and a source of B+ drive voltage, illustratively shown as +110 volts, coupled to one end of winding 41 through a primary winding 42a of a horizontal output transformer 42 and through a transformer harmonic tuning circuit comprising an inductor 43 and a capacitor 44. The other end of horizontal deflection winding 41 is coupled in series with horizontal pin winding 27b and an "S" shaping capacitor 45.

A filter capacitor 46 and a resistor 47 are coupled across pin winding 27b to minimize oscillation at horizontal harmonics. Horizontal trace and retrace currents, repeating at a frequency $1/T_H$, are generated in deflection winding 41 by a horizontal oscillator and driver circuit 48, a switching transistor 49, a damper diode 51 and a retrace capacitor 52.

The horizontal trace current flowing in horizontal pin winding 27b generates a horizontal rate magnetic flux that is magnetically coupled to vertical pin winding 27a. Together with the DC bias flux generated by pin control winding 27c, the horizontal rate magnetic flux generates a North-South pincushion correction voltage in vertical pin winding 27a of the conventional "bow-tie" shaped waveform. A potentiometer 28 adjusts the amplitude of the correction voltage, and inductor 29 and a capacitor 93 provide the proper waveshaping and phase relationship for the correction voltage.

The trace and retrace voltages appearing across primary winding 42a are stepped up by a secondary winding 42b of transformer 42 and coupled to a high voltage tripler 53 comprising diodes 54–59 and capacitors 60–64. The high voltage appearing at the cathode of diode 59, which is a function of the peak-to-peak voltage appearing across secondary winding 42b, is coupled to the ultor of a color kinescope 65. A focus voltage for a focus electrode 66 is derived at an intermediate tap point of tripler 53 through a potentiometer 67 and a resistor 68.

The bias voltages for a plurality of screen electrodes 69r, g, b are derived by trace rectification of the voltage across secondary winding 42b. During the horizontal trace interval, the AC current flows from the bottom of winding 42b through a filter capacitor 70, diode 54 and back to the top of winding 42b. The voltage across capacitor 70 is filtered by a pi filter comprising capacitor 70, a resistor 71 and a capacitor 72 and coupled to screen electrodes 69r, g, b through a resistor 73, and potentiometers 74r, g, b. A resistor 82 couples the potentiometers to ground. A conventional grid bias control circuit 77 couples the appropriate grid bias control voltages to a plurality of grid electrodes 78r, g, b for crossover point focusing of the electron beams.

Retrace pulses appearing across a secondary winding 42 c of horizontal output transformer 42 are rectified by a diode 79 and coupled to a filter capacitor 80 through a current limiting resistor 81. The voltage across capacitor 80 serves as a supply voltage for various receiver circuits, the voltage illustratively shown as +210 volts. The +210V supply serves as a bias voltage to each of a plurality of cathodes 83r, g, b of color kinescope 65 through resistors 85r, g, b.

Terminal N' of service switch 20 is coupled to a +22V supply through a resistor 87 and is coupled to a video processing circuit 88 by means of a conductor line 89. Terminal P' is coupled to ground. Terminal S' is also coupled to the video processing circuit 88 by means of a conductor line 90.

In the normal mode of operation, conductor 89 is grounded and normal video processing occurs. Video drive signals with the appropriate color information are coupled to cathodes 83r, g, b by means of conductors 91r, g, b. In the service mode of operation, conductor 90 is grounded, and conductor 89 couples the +22V supply voltage through resistor 87 to video processing circuit 88. The normal video drive signals are removed from conductors 91r, g, b and a black clamp reference signal used in setup procedure is coupled to the cathodes 83r, g, b.

In the service mode of operation, terminal S is coupled to the −40V supply through the relatively low resistance of pin control winding 27c. The −40V supply is then coupled to vertical oscillator 22 through a resistor 92, disabling operation of oscillator 22 and collapsing the vertical portion of the raster to a single horizontal line. The bias voltages at each of the screen electrodes are adjusted by means of potentiometers 74r, g, b for equal electron beam cutoff and for obtaining the desired white color temperature for the single displayed horizontal line. The receiver is then switched back to the normal mode of operation.

Since electron beam cutoff depends upon the difference between the cathode and screen electrode bias voltages, the power supply voltages for the bias voltages should not change when switching from one mode of operation to the other. If they do change, the bias voltages establishing proper color temperature during setup will change during normal operation, resulting in an improper color temperature during normal operation.

Without compensatory circuitry, the power supply voltages across capacitors 70 and 80 supplying the screen and cathode bias voltages will undesirably differ in setup as compared to normal operation. The voltages across horizontal output transformer secondary windings 42b, 42c are illustrated in FIG. 2 as a single voltage waveform, a difference between the two voltages being a matter of scale. The cathode supply across capacitor 80 is retrace rectified and will vary with any variations in the height of retrace pulse 101a of FIG. 2. The retrace pulse height depends primarily on the resonant circuit formed by retrace capacitor 52, and the parallely arranged inductances of the primary winding 42a, and the series combination of horizontal deflection winding 41 and horizontal pin winding 27b.

In normal operation, the horizontal pin winding inductance 27b is modulated and biased in part by the AC vertical rate parabolic current flowing in the pin control winding 27c, as was described previously. However, when the vertical is collapsed by the service switch, this bias disappears; the average inductance of the horizontal pin winding 27b increases, thus increasing the effective inductance of the resonant retrace circuit. The retrace interval increases, and the retrace height and cathode bias voltage decrease from the values obtained during normal operation.

The screen bias voltage is derived from the voltage across capacitor 70, which equals the peak negative excursion of the voltage appearing across secondary winding 42b during the trace interval. As shown in FIG. 2, the voltage across secondary winding 42b has two components, a constant trace voltage $V_B$, substantially independent of the inductance of horizontal pin winding 27b, and a damped ringing component 101b. This ringing component is caused by the residual resonant retrace energy left in secondary winding 42b during the trace interval.

The majority of the residual retrace energy is damped by the high impedance of the fixed tuned parallel resonant circuit of inductor 43 and capacitor 44 in series with primary winding 42a. This circuit, for high voltage tuning purposes, is resonant near a selected harmonic frequency of the retrace freqeuncy. In the service mode of operation, the retrace time will lengthen due to the disabling of vertical deflection circuit 40. The harmonic of the retrace frequency will decrease, changing the damping impedance of the tuned circuit. The ringing component contribution to the screen bias voltage may increase or decrease, depending whether the new harmonic frequency of the longer retrace frequency is closer to or farther from the resonant frequency of the tuned circuit. This will vary from one receiver to another, since the tuning of the parallel resonant circuit is fixed.

Thus, changes of both the screen and cathode bias voltages in the service mode of operation create setup errors in the electron beam cutoff and white color temperature characteristics of the kinescope when in normal mode of operation. These changes are caused by an increase in the effective inductance of the resonant retrace circuit of horizontal deflection circuit 50 occurring when vertical deflection circuit 40 is shut down, and the bias to the horizontal pin transformer winding 27b decreases. The resulting increase in effective inductance lengthens the retrace interval, decreases the retrace pulse height, and changes the screen and cathode bias voltages.

A feature of the invention is to substantially eliminate changes in the screen and cathode bias voltages from the normal to the service modes of operation. Terminal P of service switch 20 is coupled to one end of pin control winding 27c. In the normal mode of operation, switching element 20a couples unconnected terminal N to winding 27c. In the service mode, switching element 20a couples pin control winding 27c to ground through terminal S and resistor 21.

The voltage at terminal S serves as a voltage source for generating an additional bias current in pin control winding 27c when the vertical deflection circuit is disabled, and the vertical rate current flowing in pin control winding 27c which supplied the modulated bias flux to horizontal pin winding 27b has been removed. However, the average inductance of horizontal pin winding 27b does not change because the additional bias current now flowing from ground into pin control winding 27c generates an additional bias flux in horizontal pin winding 27b to compensate for the loss of flux caused by the vertical shutdown.

The average inductance of horizontal pin winding 27b and the effective inductance of the resonant retrace circuit remain substantially unchanged. Changes in the retrace pulse height and duration are substantially eliminated. The bias voltages supplied to the cathode and screen electrodes remain substantially unchanged in both normal and service modes of opertion, providing for correct color television receiver setup.

What is claimed is:

1. In a color television receiver including a vertical deflection circuit and a horizontal deflection circuit including a horizontal deflection winding coupled to a first pincushion correction winding of a pincushion correction means, the inductance of said first pincushion correction winding varying in response to the current generated in the vertical deflection winding of said vertical deflection circuit for providing a pincushion correction signal to said horizontal deflection winding, apparatus comprising:
a horizontal output transformer coupled to said horizontal deflection circuit for developing a first voltage across a secondary winding of said horizontal output transformer;
first means coupled to said vertical deflection circuit for enabling operation of said vertical deflection circuit when in a first mode of operation and disabling said vertical deflection circuit when in a second mode of operation; and
second means coupled to said pincushion correction means for adjusting the inductance of said first pincushion correction winding when in said second mode of operation in order to compensate for a change in the inductance of said first pincushion correction winding when in said second mode of operation for maintaining said first voltage substantially unchanged.

2. Apparatus according to claim 1, including a color kinescope with a plurality of electron guns, each of said guns including a cathode and at least one control electrode, and including a first power supply coupled to said secondary winding and to at least one of said cathode and control electrodes for providing a first bias voltage to at least one of said cathode and control electrode.

3. Apparatus according to claim 2, wherein said first power supply includes a first rectifying means poled for conducting current during said horizontal retrace interval for providing said first bias voltage.

4. Apparatus according to claim 2, including a high voltage secondary winding coupled to said horizontal output transformer for developing a second voltage across said high voltage secondary winding and a second power supply coupled to said high voltage secondary winding and to at least one of said cathode and control electrode for providing a second bias voltage to at least one of said cathode and control electrode, said second voltage remaining substantially unchanged in both said first and second modes of operation.

5. Apparatus according to claim 4, wherein said second power supply includes a second rectifying means poled for conducting current during said horizontal trace interval for providing said second bias voltage.

6. Apparatus according to claim 1, wherein said first pincushion correction winding is magnetically coupled to a second pincushion correction winding of said pincushion correction means, said second pincushion correction winding coupled to said vertical deflection winding for generating a magnetic flux varying at a vertical rate for varying the inductance of said first pincushion correction winding for providing said first pincushion correction signal.

7. Apparatus according to claim 6, wherein said second means generates a bias current in said second pincushion correction winding when in said second mode of operation for maintaining the average inductance of said first pincushion correction winding substantially unchanged.

8. In a color television receiver, a circuit comprising:
a horizontal deflection winding;
a primary winding of a horizontal output transformer coupled to said horizontal deflection winding;
a retrace capacitor coupled to said horizontal deflection winding for forming a resonant retrace circuit;
pincushion correction means coupled to said horizontal deflection winding for providing an East-West pincushion correction voltage to said horizontal deflection winding by varying the inductance of said pincushion correction means at a vertical rate in response to operation of a vertical deflection circuit;
switching means for switching operation of said color television receiver from a first mode of operation to a second mode of operation, said vertical deflection circuit becoming disabled in said second mode of operation; and first means responsive to said switching means for maintaining the average inductance of said pincushion correction means substantially constant in said second mode of operation when said vertical deflection circuit becomes disabled for maintaining the resonant retrace frequency of said resonant retrace circuit substantially unchanged.

9. A circuit according to claim 8, wherein said pincushion correction means comprises a first winding of a pincushion transformer, said pincushion transformer including a second winding coupled to said vertical deflection circuit for magnetically coupling to said first winding a vertical rate varying magnetic flux for varying the inductance of said first winding for providing said East-West pincushion correction voltage.

10. A circuit according to claim 9, wherein said first means couples said second winding to a reference potential when operating in said second mode of operation for introducing a bias current into said second winding for maintaining the average inductance of said first winding substantially constant.

11. A circuit according to claim 8, wherein the voltage across a first secondary winding of said horizontal output transformer is rectified during the horizontal retrace interval for providing a first bias voltage to a first electrode of an electron gun of a color kinescope.

12. A circuit according to claim 8, wherein the voltage across a second secondary winding of said horizontal output transformer is rectified during the horizontal trace interval for providing a second bias voltage to a second electrode of an electron gun of said color kinescope.

13. A circuit according to claim 12, wherein a circuit tuned to a harmonic of said horizontal retrace frequency is coupled to said primary winding for damping during said trace interval a ringing component of the voltage across said second secondary winding.

14. A color television receiver setup circuit, comprising:
a color kinescope including a plurality of electron guns, each of said guns having a cathode and at least one control electrode;
a vertical deflection circuit;
a horizontal deflection winding;
a first pincushion correction winding coupled to said horizontal deflection winding;
first means coupled to said first pincushion correction winding for varying the inductance of said pincushion correction winding in response to the current generated in a vertical deflection winding of said vertical deflection circuit for providing a pincushion correction signal to said horizontal deflection winding;
a horizontal output transformer;
first power supply means coupled to a first secondary winding of said horizontal output transformer for providing a first bias voltage to at least one of said cathode and said control electrode;
setup switching means for disabling said vertical deflection circuit and providing a reference signal to said electron guns during setup operation; and
second means coupled to said setup switching means for developing a magnetic bias flux in said first pincushion correction winding during said setup opearation for maintaining said first bias voltage substantially unchanged during setup operation.

15. A setup circuit according to claim 14, including a second pincushion correction winding coupled to said vertical deflection winding and magnetically coupled to said first pincushion correction winding for providing said pincushion correction signal, wherein said second means couples said second pincushion correction winding to a soucre of bias current for developing said magnetic bias flux.

16. A setup circuit according to claim 14, wherein said first power supply means rectifies a horizontal retrace pulse appearing across said first secondary winding, the magnitude of said first bias voltage depending upon said retrace pulse height.

17. A setup circuit according to claim 14, including a second power supply means coupled to another secondary winding of said horizontal output transformer for providing a second bias voltage to at least one of said cathode and control electrode, said second means maintaining said second bias voltage substantially unchanged during setup operation.

18. A setup circuit according to claim 17, including a primary winding of said horizontal output transformer coupled to a high voltage tuning means, said high voltage tuning means resonant at a harmonic of the retrace frequency, said second power supply means rectifying the peak voltage across said other secondary winding during the trace interval, said peak voltage depending upon a ringing component repeating at said retrace frequency, said ringing component being damped by said high voltage tuning means.

* * * * *